United States Patent [19]

Brock, Jr.

[11] 4,189,908
[45] Feb. 26, 1980

[54] FLEXIBLE RAKE

[76] Inventor: George F. Brock, Jr., 1025 Fallen Leaf Rd., Arcadia, Calif. 91006

[21] Appl. No.: 879,383

[22] Filed: Feb. 21, 1978

[51] Int. Cl.$^2$ .......................... A01D 7/02; A01D 7/06
[52] U.S. Cl. ............................... 56/400.17; 56/400.01
[58] Field of Search ........... 56/400.01, 400.17, 400.18, 56/400.21

[56] References Cited

U.S. PATENT DOCUMENTS

| | | | |
|---|---|---|---|
| 1,693,492 | 11/1928 | Ostberg | 56/400.17 |
| 2,018,311 | 10/1935 | McGuire | 56/400.17 |
| 2,065,830 | 12/1936 | Sherman | 56/400.21 |
| 2,066,036 | 12/1936 | Greenwood | 56/400.17 |
| 2,519,714 | 8/1950 | Stevens | 56/400.17 |
| 2,529,025 | 11/1950 | Kaufman | 56/400.17 |
| 2,794,312 | 6/1957 | Finkes | 56/400.17 |
| 2,847,816 | 8/1958 | Yeda | 56/400.17 |
| 3,168,151 | 2/1965 | Kavanagh | 56/400.17 |
| 3,673,893 | 7/1972 | Keller | 56/400.17 |
| 3,724,188 | 4/1973 | Eads | 56/400.17 |

FOREIGN PATENT DOCUMENTS 468206  9/1950  Canada ................................. 56/400.17

*Primary Examiner*—John F. Pitrelli
*Assistant Examiner*—Paul J. Hirsch
*Attorney, Agent, or Firm*—Donald D. Mon

[57] ABSTRACT

A flexible rake has a set of flexible tines extending forwardly from a supporting panel and means for retaining the tines in the form of a pair of retaining strips one of which contains on one side thereof a number of spaced inverted cups and the other of which contains on one side thereof a number of spaced nipples. The spacing between the nipples is somewhat different from the spacing between the cups. One of the strips is placed above the tines and the other of the strips is placed below the tines so that the nipples can extend between the tines and into corresponding cups, and they are fastened together. Each tine is thus individually held between a spaced-apart pair of nipples and cups, and is allowed freedom of movement both laterally and vertically relative to the retaining strips. The retaining strips are also allowed some movement in a fore and aft direction and in a twisting direction, relative to the tines. The retaining strips have a convex arc and also a crown so that the center part of the rake tines is at a higher elevation than the side parts.

8 Claims, 9 Drawing Figures

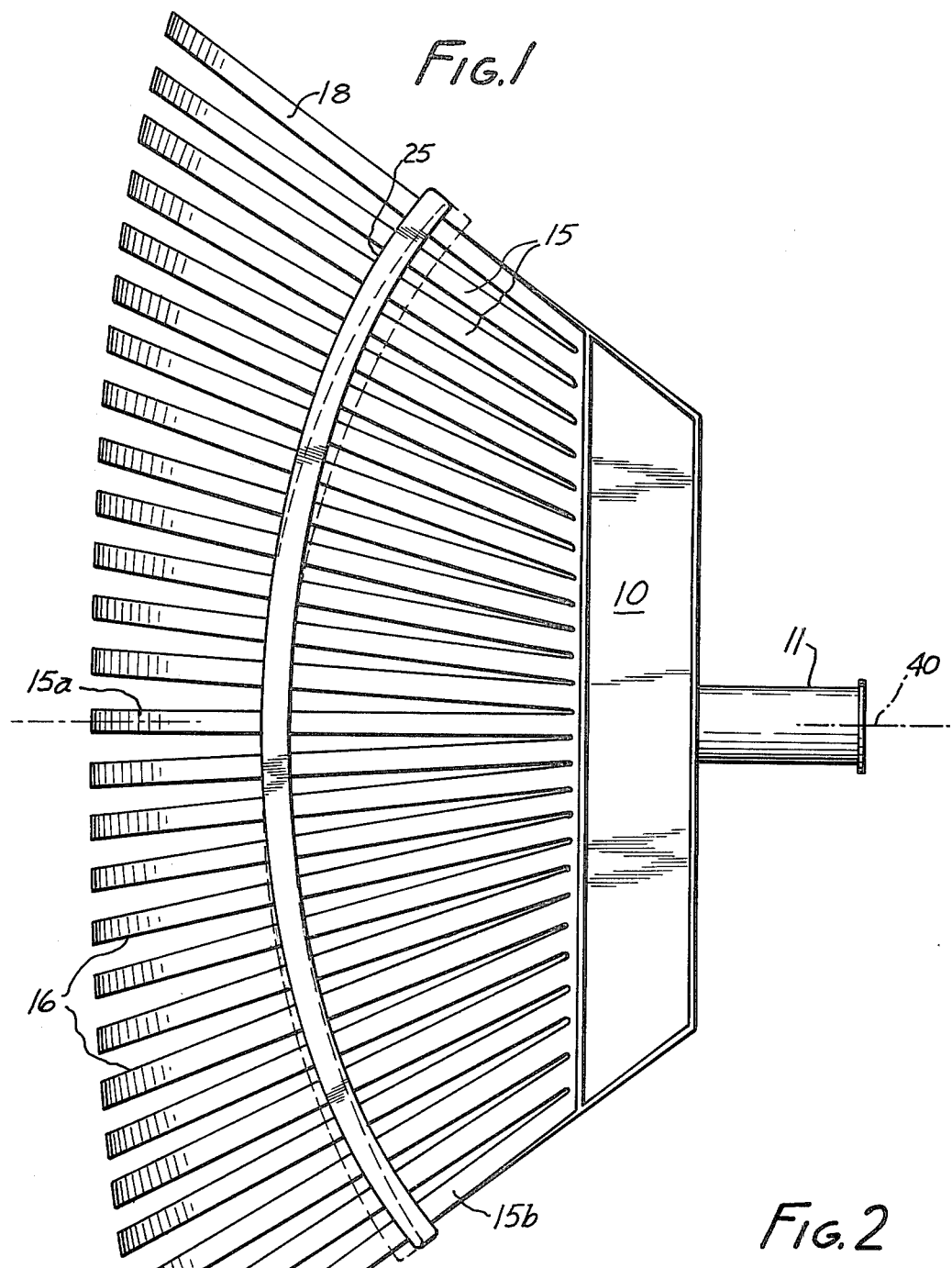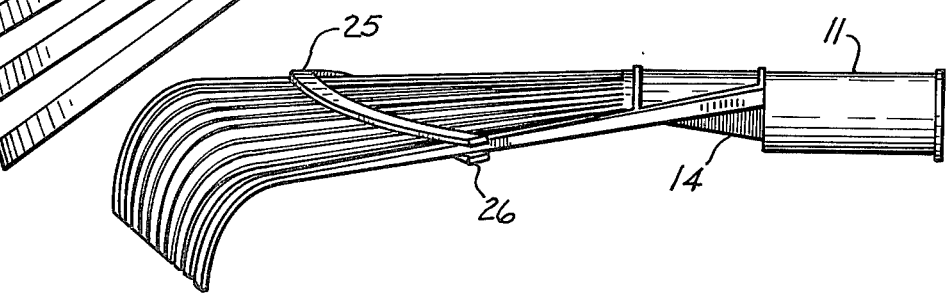

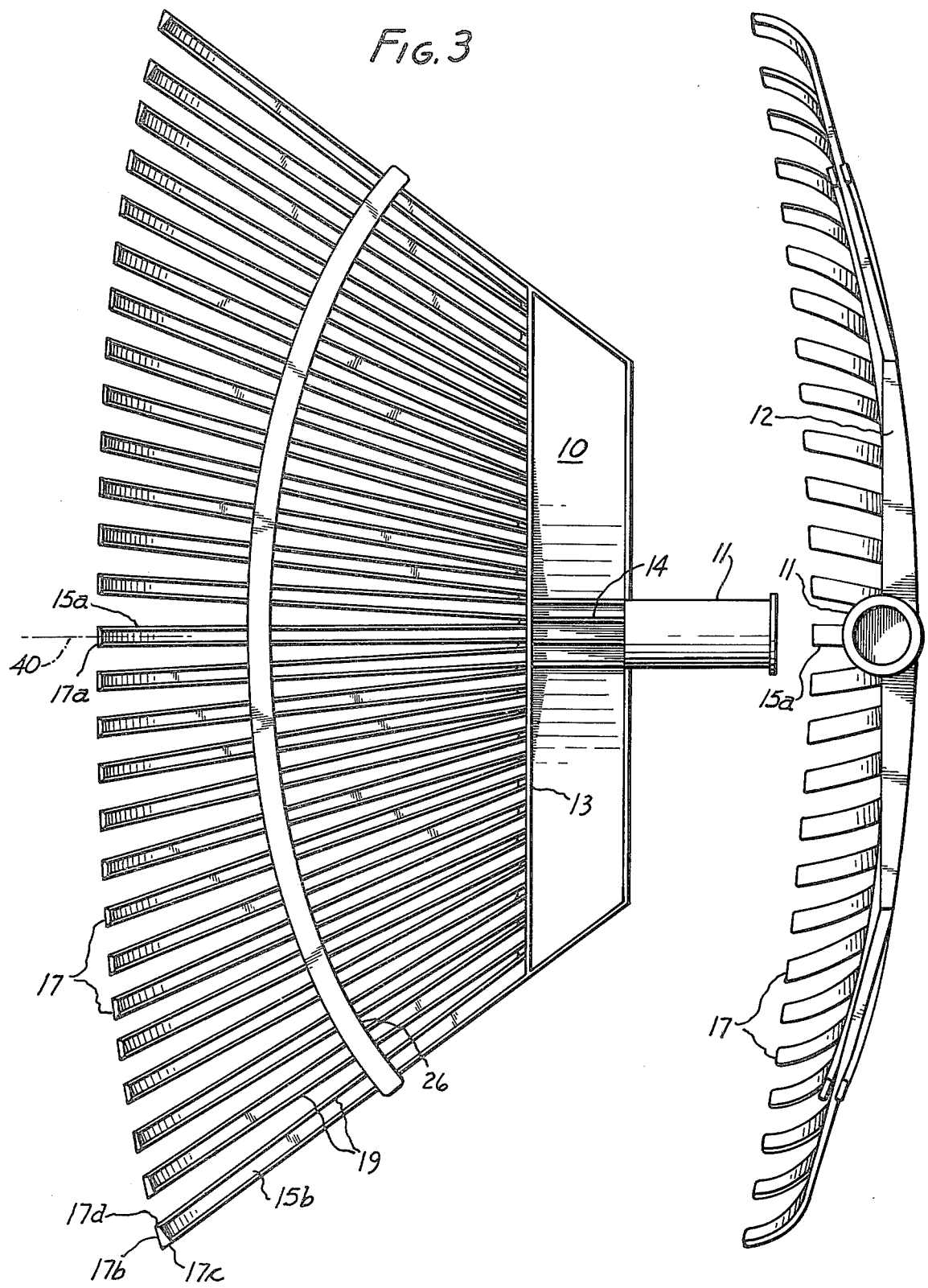

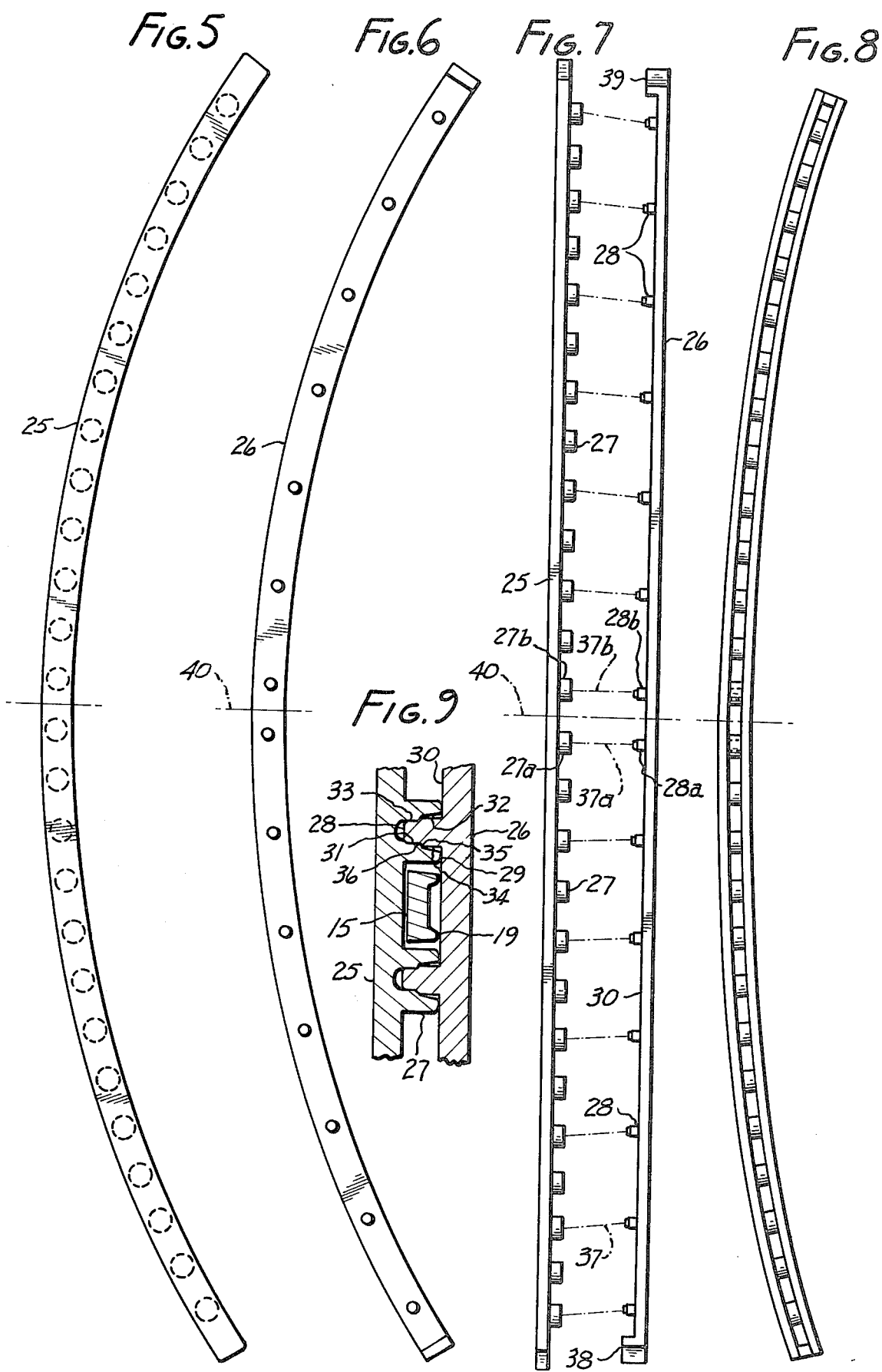

FLEXIBLE RAKE

This invention relates to flexible rakes of the type having a number of flexible tines which spread forwardly from a support near the handle.

Such flexible rakes are well known and have long been used for raking objects such as debris and grass cuttings and the like. A one-piece cast plastic rake of this general type is shown in Eads U.S. Pat. No. 3,724,188, issued Apr. 3, 1973.

Heretofore the tines of such rakes have been held in a support at their rear ends, and also cross struts or the like have been securely fastened to them to secure them in their positions. Owing to the flexibility required for the tines, they have been subject to damage and have sometimes been bent out of shape. Important parts of such rakes have been the areas near the sides where the forward tips of the tines are spread furthest apart. It has heretofore been found that while the more centrally located tines tend to hold their desired positions relatively well and provide for effective raking of debris in their path of movement, the outer tines near the sides have a greater tendency to become bent and lose some of their effectiveness during a raking operation. I have found that flexible rakes of the type where the tines have been tightly fixed to a cross strut or strip have not functioned as effectively as if the tines are allowed some relative motion with respect to each other and with respect to a cross strip.

An object of the present invention is to provide a flexible rake of the type having flexible tines, which provide more efficient raking than previously known flexible rakes.

The invention is carried out by provision of a fan-like array of flexible tines extending generally forwardly from a supporting panel containing means for attachment to a handle. A tine-retaining strip means extends laterally across the tines in a convex arc or bow and is shaped in the form of a crown, the highest part of which is at the center of the array of tines so that the strip means slants somewhat downwardly toward its sides. The strip is provided with spaced separation means and is assembled to the tines so that individual ones of the tines extend between adjacent pairs of separation means in such a manner that the tines are permitted a substantial degree of both lateral and vertical movement between the separators. By reason of this construction the tines toward the opposite sides of the rake are held at a lower elevation than at the center of the rake and furthermore the tine-retaining strip means is permitted some movement relative to the tines, in addition to the lateral movement permitted the individual tines within the region defined by the separators.

This arrangement maintains the desired array of the tines and also provides for improved efficiency of raking as well as improved protection for the tines.

The foregoing and other features of the invention will be better understood from the following detailed description and the accompanying drawings of which:

FIG. 1 is a plan view of a flexible rake in accordance with this invention;

FIG. 2 is a side elevation view of the rake shown in FIG. 1;

FIG. 3 is a bottom view of the rake shown in FIG. 1;

FIG. 4 is a rear view of the rake shown in FIG. 1;

FIG. 5 is a top view of an upper tine-retaining strip which appears in FIG. 1;

FIG. 6 is a top view of a lower tine-retaining strip which appears in FIG. 3;

FIG. 7 illustrates the relationship of the retaining strips of FIGS. 5 and 6 as seen from the front.

FIG. 8 illustrates the retaining strips of FIGS. 5 and 6 as fitted to each other; and FIG. 9 is an enlarged view showing structure by which the retaining strips of FIGS. 5 and 6 are assembled to each other.

Referring to the drawings, the flexible rake comprises a rearward rigid laterally-extending panel 10 from which there protrudes a hollow support 11 adapted to receive the end of a rake handle in a well known manner. The panel has a rear laterally-extending wall 12 and a forward laterally-extending wall 13 which supply rigidity. Additional rigidity is supplied by ribs 14 at the under side of the panel which extend from the rear wall 12 and the forward part of handle support 11 to the forward wall 13. A plurality of spaced flexible tines 15 extend forwardly from the forward wall 13, to which they are attached, in a fan-like array according to ordinary practice in construction of flexible types of rakes. Near their forward ends the tines curve downwardly at 16 so that their tips 17 approach the ground being raked, in an approximately vertical direction. Each tine comprises a substantially flat portion 18 except at the region of the forward ends, and preferably has depending ribs 19 along its sides which supply some added rigidity. The tine ribs taper from a widest dimension at the wall 13, gradually decreasing in dimension toward the tine tip where virtually no rib remains. The centermost tine 15a has a tip end 17a which is of substantially uniform thickness across its lateral width. The tips of the tines close to, and on either side of, the central tine are also substantially uniform or nearly so. But toward each side of the rake the tips of the tines are thicker at their sides remote from the center, and this difference in thickness increases toward the side tines. For example, the tine 15b furthest to one side of the rake, has a tip 17b which is substantially thicker at its outside end 17c than at its inside end 17(d).

For the purpose of producing a crown on the array of tines there is provided a pair of tine retaining strips, these being a retaining strip 25 above the tines and a retaining strip 26 beneath the tines. These retaining strips are attached to each other in a manner presently to be described.

Referring to FIGS. 5 through 9 the upper retaining strip 25 is formed in the shape of an arc or bow and when it is unattached to the lower retaining strip 26 it lies substantially flat in a plane. The lower retaining strip 26 is formed in a somewhat similar arc or bow as shown in FIG. 6, and it too lies flat in a single plane when unattached to the other retaining strip 25. Each strip 25 and 26 is flat on its upper and lower surfaces. The lower surface of upper strip 25 has a plurality of protuberances 27 in the general form of inverted cups extending downwardly at spaced intervals, and the upper surface of lower strip 26 has a plurality of spaced nipples 28 protruding upwardly. The inverted cups 27 are spaced substantially equally apart along the strip 25, and there may be one less cup than the number of tines of the rake. The spacing between the cups is somewhat greater than the width of each tine so that a tine may be fitted between each adjacent pair of cups while still allowing some lateral movement of the tine between the cups, as is best seen in FIG. 9. The heights of all the cups are equal and are such that when the circular rim 29 of each cup is in contact with the upper surface 30 of the lower strip 26, some movement of the tine in the up-and-down direction between the two strips 25 and 26, as well as lateral movement, is permitted, as is best seen in FIG. 9.

The base portion of each inverted cup has a cylindrical wall 31, and the lower portion 32 near the cup rim 29 has a conical wall 32 which converges upwardly toward the inverted base of the cup. The upper portion of each nipple 28 has a cylindrical wall 33 which is inserted into the cylindrical wall 31 of the corresponding cup as best seen in FIG. 9. The lower portion of each nipple has a cylindrical wall 34 of somewhat larger diameter than the cylindrical wall 33 but no larger than the diameter of the conical wall 32. The relationship is such that the conical wall meets the cylindrical wall of the cup at a shoulder 35 and the cylindrical walls 33 and 34 of the nipple meet at a shoulder 36. The dimensions of the cup and nipple are such that when the rim 29 meets surface 30 of strip 26 the shoulders 35 and 36 are in substantial contact, or close to substantial contact with each other and the cylindrical walls 31 and 33 of the cup and nipple, respectively, are in close contact.

Although it would be possible to provide as many nipples as there are inverted cups it is not necessary to do so, as a lesser number of nipples than cups can be provided. It is seen that in FIGS. 5–9 there is a lesser number of nipples than cups. Each nipple is positioned on its strip 26 so as to be juxtaposed, or substantially juxtaposed, to a corresponding cup as indicated by the broken lines 37 in FIG. 7 each of which extends between a nipple and its respective cup. It is seen that in the particular arrangement illustrated, each adjacent pair of nipples is positioned to meet a pair of cups which are not adjacent to each other for the reason that between each such pair of cups there is a cup for which there is no corresponding nipple. There is one exception to this placing of a cup unrelated to a nipple between each adjacent pair of cups, this exception being the two central cups 27a and 27b which relate to the two central nipples 28a and 28b. It is also seen that the spacing between adjacent nipples is not exactly the same as the spacing between the cups which correspond to such adjacent nipples except at a central position of the strips. Thus the centers of the two central nipples 28a and 28b which are located on either side of the center line 40 of the fan-like array of tines has a spacing which is exactly equal to the spacing between the two corresponding cups 27a and 27b; and each of these two nipples is exactly juxtaposed to its respective cup as is illustrated by the broken lines 37a and 37b which are parallel to each other and perpendicular to the surfaces of strips 25 and 26. The cups, and the combination of cup and nipples as shown, are sometimes called "separation means". It is evident in FIG. 7 that only some of the separation means need to physically join the strips together, but that all extend between the strips (see FIG. 8). Cups such as cups 27 do not receive a nipple, and are not necessarily attached to the opposite strip, but still function to space apart the tines and the strips.

As a result of the fact that the spacings between the centers of cups which correspond to adjacent nipples are greater than the spacings between the centers of these corresponding nipples it is observed that the angularity from the perpendicular of the broken lines 37 increases from the center of the strips toward the side edges, so long as the strips 25 and 26 lie flat in their planes. As a result of these differences in spacings the nipples cannot be inserted into their corresponding cups without crowning the strips as shown in FIG. 8. Accordingly, in assembling the strips 25 and 26 to the tines of the rake as illustrated in FIGS. 1, 2, and 3 the strips 25 and 26 are applied above and below the tines as illustrated in FIG. 2. By bending the strips to put them into a crown shape as shown in FIG. 8, each nipple is made to enter its respective cup as illustrated in FIG. 9, whereupon the crown shape is structurally maintained, with the rims 29 of all the cups in contact with the upper surface of strip 26 in the position shown in FIG. 8. By reason of this, the strips maintain their permanent bow, best seen in FIG. 1, as well as their crown, best seen in FIGS. 4 and 8. Thus there is a tine passing through each space between adjacent cups as illustrated in FIG. 9 and a significant degree of movement both laterally and vertically is permitted to each tine relative to the cups between which it is located.

There are numerous means for joining the strips together. As one example, an adhesive can be placed between the cups and nipples. The preferred means is to utilize a nipple whose diameter is greater than that of its respective cup. Then the strips are pressed toward one another while applying ultrasonic energy which softens the contiguous surfaces and enables the nipples to enter the cups. Then when the ultrasonic energy is shut off, the nipples and cups will have been sonically welded together. The illustrated configuration is well-suited for this type of assembly.

It has been found that the two endmost tines can be held in their position without any structure for connecting the ends of strips 25 and 26. Such arrangement is illustrated in FIGS. 1–4. In this arrangement the ends of strips 25 and 26 extend a significant distance beyond the outsides of the outside tines so that these tines cannot be disengaged from their positions between the strips. If desired, these two tines at the extreme sides of the rake can be more securely contained by constructing the lower strip 26 with upstanding walls 38 and 39 at its opposite ends as shown in FIG. 7. The height of such walls would be the same as the height of the cups 27.

It is seen that in accordance with this invention there is provided a flexible rake having flexible tines of which each individual tine is allowed substantial movement both laterally and vertically in addition to movement due to its flexibility. Furthermore, the retaining strips, joined together as a unitary tine-retaining strip means is allowed some fore-and-aft movement as well as some twisting movement relative to the tines as indicated in phantom in FIG. 1. Thus freedom of movement between the tines and also between the tines and retaining strip serve to protect the tines from damage and enhance the raking efficiency. Moreover, even though allowed these movements the crown shape of the strips 25 and 26 brings the forward tip ends of the tines progressively lower in the directions away from the central tines. This is found to be an advantage in raking as it enables the outside tines to capture debris and to retain it more efficiently than if the tips of all the tines were at the same elevation.

The rake including the supporting panel, the tines and the tine-retaining strips may be made of suitable plastic material such as polyvinyl chloride, polyvinyl acetate, or polycarbonate.

Strips 25 and 26 may be made of ABS, polycarbonate, or other suitable material. The strips are not rigid, because they must bend to form the crowned shape. Instead, they are somewhat stiffly flexible, and so is their assembly when they are joined together. Their assembly tends to be rather rigid when compared to the individual tines, but can bend when stepped on or when bent by hand, and still spring back to the crowned shape. Thus, this assembly is stiffly flexible. Its shape can be changed by bending it with a suitably strong force, but it tends to spring back. Within its limits it is not intended to be permanently deformed by overstressing.

This invention is not to be limited by the embodiment shown in the drawings and described in the description which is given by way of illustration and not of limitation, but only in accordance with the scope of the appended claims.

I claim:

1. A flexible rake comprising:
    a supporting panel adapted to be held by a handle extending rearwardly from the panel;
    a plurality of flexible tines rigidly connected to said panel spaced laterally from each other and extending generally forwardly from the panel in a fan-like array, the forward tips of said tines curving downward for raking debris;
    tine-retaining strip means extending laterally across the tines in a convex arc the most forward part of which is in the region of the central part of the rake;
    said strip means comprising two overlaying strips, one passing across the upper surfaces of the tines and the other passing across the under surfaces of the tines, and separation means at least a plurality of which interconnect said strips, and all of which extend into the spaces between adjacent tines and proportioned to allow free but limited movement of the tines, laterally and vertically and also limited fore-and-aft movement of said strip means; and
    said strip means having a crown shape which causes the tines toward the sides of the rake to be depressed relative to tines at the center of the rake.

2. A rake according to claim 1 in which the separator means comprises cups attached to one of the strips and nipples attached to the other of the strips, said nipples and cups protruding toward each other and said nipples being adapted to enter into corresponding ones of the cups.

3. A rake according to claim 2 in which the strips before being attached to each other at the cups and nipples, are arcuate and flat with nipples toward the sides being offset relative to corresponding cups, whereby when the nipples are secured within their corresponding cups, the strips are formed into their crown shape.

4. A rake according to claim 1 in which the side edges of the tines have downwardly depending ribs the height of which decreases toward the front end of the rake.

5. A rake according to claim 1 in which the strip means is stiffly flexible.

6. A rake according to claim 4 in which the strip means is stiffly flexible.

7. A flexible rake comprising:
    a supporting panel adapted to be held by a handle extending rearwardly from the panel;
    a plurality of flexible tines spaced laterally from each other and extending generally forwardly from the panel in a fan-like array, the forward tips of said tines curving downward for raking debris;
    tine-retaining strip means, extending laterally across the tines in a convex arc the most forward part of which is in the region of the central part of the rake, said strip means comprising two strips which overlie each other, one of the strips passing across the upper surfaces of the tines, and the other strip passing across the under surface of the tines; said strip means having separation means extending into the spaces between adjacent tines and proportioned to allow limited movement of the tines, laterally and vertically, said separation means comprising cups attached to one of the strips and nipples attached to the other of the strips, said nipples and cups protruding toward each other and said nipples being adapted to enter into corresponding ones of the cups; and
    said strip means having a crown shape which causes the tines toward the sides of the rake to be depressed relative to tines at the center of the rake.

8. A rake according to claim 7 in which the strips before being attached to each other at the cups and nipples, are arcuate and flat with nipples toward the sides being offset relative to corresponding cups, whereby when the nipples are secured within their corresponding cups, the strips are formed into their crown shape.

* * * * *